Oct. 19, 1965     H. W. HEINICHEN     3,212,202
ARITHMETIC TEACHING AID
Filed Dec. 5, 1963
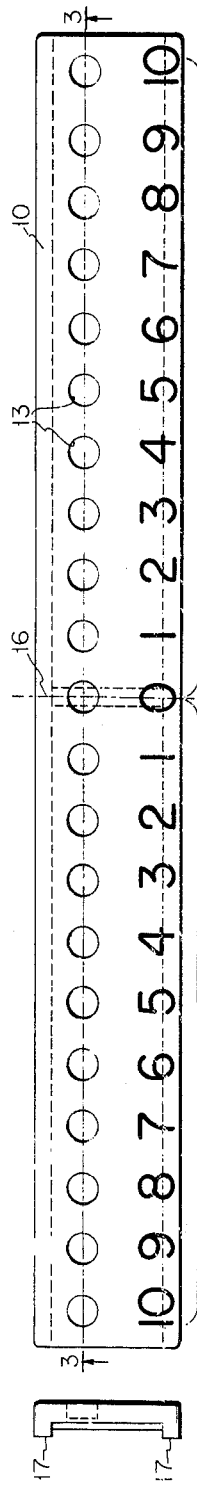
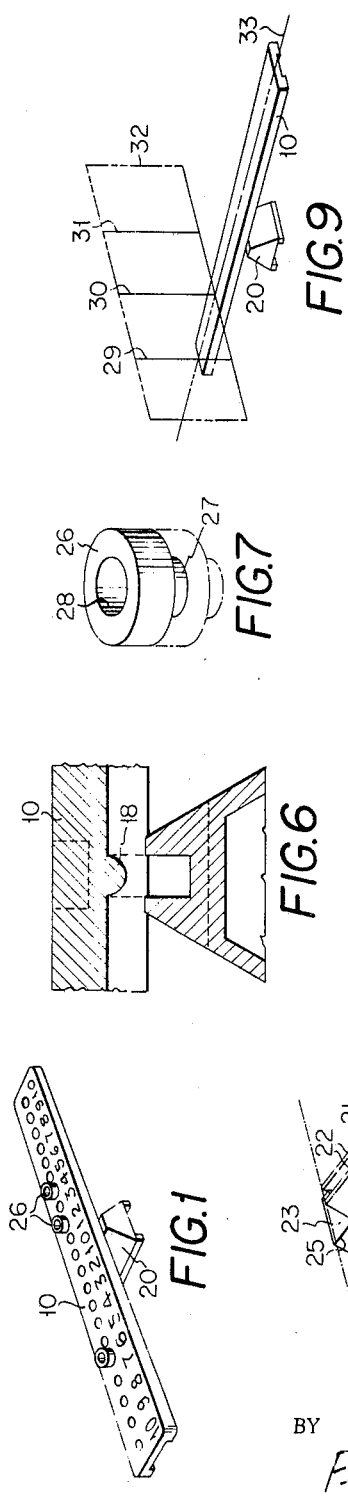
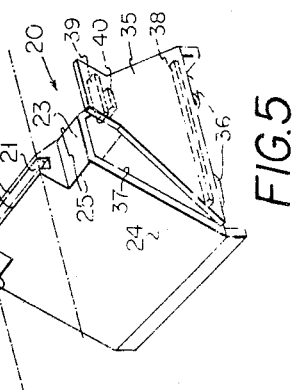
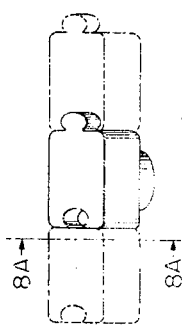
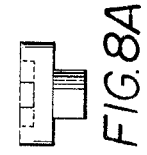
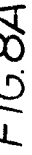
INVENTOR.
HENRY W. HEINICHEN
BY
*Flehr and Swain*
ATTORNEYS

United States Patent Office 3,212,202
Patented Oct. 19, 1965

3,212,202
ARITHMETIC TEACHING AID
Henry W. Heinichen, P.O. Box 838, Palo Alto, Calif.
Filed Dec. 5, 1963, Ser. No. 328,327
7 Claims. (Cl. 35—31)

This invention relates to educational aids and the like. More particularly, it pertains to an arithmetic teaching aid. The device is particularly useful in demonstrating certain relationships of numbers taken in various combinations in order to aid in the teaching of addition, subtraction, multiplication and division.

In general, it is an object of the present invention to provide a device for creating an association and visual perception of numerical relationships.

Another object of the invention is to provide such a device wherein simple arithmetic equations can be solved.

It is still another object of the invention to provide a device capable of demonstrating arithmetical addition wherein both the addend and augend can be any number taken from a predetermined order of integers.

A further object, therefore, of the invention is to provide a device of the kind described above wherein the addend and augend can be the same number and can be combined to provide a sum, for example, to solve the problem 2+2=4.

Another object of the invention is to provide a teaching aid for arithmetic wherein familiarity with the tens function is encouraged.

Other objects of the invention will be more readily apparent from the following description of a preferred embodiment when taken with the accompanying drawings in which:

FIGURE 1 is a perspective view of the teaching aid according to the invention;

FIGURE 2 is a top plan view of the beam of the teaching aid;

FIGURE 3 is an elevation section along the line 3—3 of FIGURE 2;

FIGURE 4 is an end view of FIGURE 2;

FIGURE 5 is an objective view of a fulcrum member;

FIGURE 6 is a detailed view of the fulcrum member and beam taken along the centerline of the beam;

FIGURE 7 shows a stackable token for weighting the beam;

FIGURE 8 shows another token;

FIGURE 8A is a front view of FIGURE 8; and

FIGURE 9 is a diagram representing spacial disposition of tokens on the beam.

In general, there has been provided an arithmetic teaching aid comprising an elongated balance beam of predetermined length. Preferably, the balance beam is of uniform mass throughout its length so that a fulcrum member can be arranged to support the beam at its midpoint. In any event, however, the fulcrum member supports the beam substantially at the center of gravity to provide a pair of balance arms extending in opposite directions from the fulcrum member. The beam is formed to include in each arm a series of uniformly spaced engagement portions, such as recesses, thereby serving to subdivide each arm of the beam into a linear scale. Each scale originates at the center of gravity of the beam, and the linear displacement of each recess from the origin serves to define a lever arm of a length representing one number in a sequence thereof. The sequence, starting with the origin as the lowest number therein, includes a first order of numbers and further includes the first number of the next greater order. A numeral is associated with each recess to identify its related displacement from the origin and its relative position in the sequence.

Each of a plurality of tokens is arranged to ride on one of the arms of the beam. The tokens all have the same weight. The plurality of tokens riding on one arm applies a given torque to the beam in one direction. The displacement from the origin of each of the plurality of tokens on the one arm serves to identify a given number representing the addend or augend of a problem. Another token also having the same weight as each of the previous tokens is formed to engage one of the recesses in the other arm of the beam to apply an opposing torque. The linear displacement of the last named token from the origin of the scale on its arm, when the plurality of tokens on the other arm have been equally counterbalanced, serves to identify a number equaling the sum of the given numbers.

A teaching aid of the kind described is shown in the drawings wherein an elongated balance beam 10 is provided. A fulcrum member 20 of generally triangular configuration is arranged to support beam 10 substantially at its center of gravity. Preferably, beam 10 is of a material having uniform dimension and mass along its length so that its center of gravity and midpoint coincide to provide a pair of equal length balance arms 11, 12.

Each arm of the beam is subdivided by a series of uniformly spaced engagement portions such as the recessed holes 13 defining on each arm, a scale 14, 15 having a common origin at the center of gravity or mid-point of the beam.

The linear displacement of each recessed hole 13 from the origin 16 to define a lever arm of a length representing a number, preferably an integer, in a sequence of numbers. The sequence of numbers in each scale 14, 15 forms a first order of integers wherein the origin is the lowest number therein and wherein the highest number of the sequence is the first number of the next greater order of integers. The numerals "0" through "10" are associated with each of holes 13 to identify the related displacement of each from origin 16 and its relative position within the sequence of holes comprising scales 14, 15.

The bottom side of beam 10 is formed to include longitudinal side edges 17 disposed in parallel spaced relation along the beam and in the region of fulcrum member 20 serving to provide a limited stability to compensate for non-uniformity in distributed mass along the beam, as further described below.

Means forming a fulcrum engaging portion across the beam at the center of gravity is provided by a rib 18 formed on the bottom surface of beam 10. Rib 18 extends transversely thereof between the side edges 17. Fulcrum member 20, of a generally three-sided triangular construction, includes a groove 21 which is slightly less than coextensive with rib 18 and adapted to receive same therein. Groove 21 is defined between a pair of beam supporting lips 22 adapted to form a relatively wide fulcrum support area slightly broader than the width of groove 21.

It is considered that a line contact as would be formed, for example, by a knife-edge, provides a beam which is too sensitive, thereby increasing frustration of children utilizing the device. Also, a knife-edge support would require much more exacting distribution of mass and dimensioning. Thus, the broader area of support given to beam 10 by lips 22 imparts a limited degree of stability to it without affecting the principle of operation. Use of the slot and rib engagement at the center of gravity of beam 10 further serves to insure a quick and accurate disposition of fulcrum member 20 as well as to minimize longitudinal slippage of beam 10 with respect to fulcrum member 20 during manipulation, handling and use of the device.

Means further serving to aid in the assembly of the equipment and to give limited stability to its operation is provided by a pair of horizontally disposed areas or flats 23 formed by removing a triangular portion of fulcrum member 20 at each end of groove 21 and including the vertex formed by the sides 24 of member 20. Flats 23 are spaced below a plane through lips 22 sufficiently to provide a slight clearance between the bottom of side edges 17 and the edges 25 of flats 23.

The teaching aid further includes a number of tokens 26 of a kind, for example, as shown enlarged in FIGURE 7. Fulcrum member 20 is a hollow structure provided with an opening 36 to form a receptacle whereby several tokens 26 can be stored within. All tokens 26 are of the same weight. Tokens 26 are formed to include a first engagement portion formed to coact with the engagement portions formed in beam 10. For example, the first engagement portion of token 26 can be in the form of a protruding stud portion 27.

Each token 26 further includes a second engagement portion, such as the hole 28 drilled to form a recess in the top surface thereof comparable to recesses 13 formed in beam 10. Accordingly, each token 26 is formed to include a protruding portion serving to coact with and be engaged by the recesses in beam 10 and further includes a recess of its own to engage the protruding portion of another of the tokens to dispose a plurality of tokens in nested relation.

Where the tokens are arranged in mutual engagement with one another for operations as described below, a vertical axis disposed through the center of gravity of each of the several mutually engaged tokens and a vertical axis disposed through the aggregate center of gravity of the mutually engaged tokens will all be disposed so as to lie in a common plane normal to the longitudinal axis of the beam, when the beam is horizontally disposed. In short, using tokens of a kind shown in FIGURE 7, such as token 26, two or more tokens can be stacked one on top of the other. However, a token of the kind shown in FIGURE 8 can be utilized so as to mutually engage several tokens in a side by side relation wherein the above defined relationship continues to hold true, as shown in the diagram of FIGURE 9.

Reference numerals 29, 30, and 31 each relate to a vertical axis through the center gravity of each of three tokens disposed in side by side relation. Axis 30, however, also represents a vertical axis through the center of gravity of all three tokens either vertically stacked or laterally arranged. Thus, all the vertical axes lie in a common plane 32 normal to the longitudinal axis 33 of beam 10, when the beam is horizontally disposed.

Operation of the teaching aid is as follows.

In its simplest form a plurality of two tokens of equal predetermined weight are placed to be engaged by the holes of one arm to apply a given torque to the beam in one direction. The linear displacement from the origin of each of the two tokens on the one arm serves to identify a given number representing an addend or augend. For example, if one token is disposed in the hole associated with numeral 3 and another is disposed to be associated with numeral 5 on the same scale, 14 or 15 the former can be considered the addend and the latter the augend where two integers to be added. Now, if another token of the same predetermined weight is engaged by a hole on the opposite side of fulcrum member 20, say, in scale 15, to thereby apply an opposing torque, its displacement from origin 16, when equally counterbalancing the tokens on scale 14 serves to identify a number which equals the sum of three and five, i.e., numeral 8.

The following arithmetic examples will further serve to explain operation of the teaching aid as well as to demonstrate its visual manifestation and association of various number combinations.

In all of the following examples the equal sign (=) is manifested by the balancing of beam 10. This further serves to create a teaching environment for observing and learning so-called "balanced" equations.

To perform the following equations, $2+4=6$, a first token is placed in the hole for numeral 4 and a second token in the hole for numeral 2, both disposed on the same side of fulcrum 20. A third weight is then disposed at the "6" hole on the other side of fulcrum member 20. This manipulative and visual experience is then expressed to the student by the above equation in written form.

To perform $3+3=6$ a pair of tokens, such as 26 are nested together in the "3" hole on one scale and the student then balances the beam by placing another token in the "6" hole on the other scale. Thus even where addend and augend are the same, problems can be demonstrated. This permits the showing of all the various combinations of integers which can equal a given sum.

For example the following relationships can be expericened:

$$8=1+7=2+6=3+5=4+4$$

To perform this demonstration a token is placed on the numeral "8" on one scale and a pair of tokens are respectively disposed in holes 13 identified with numerals "1" and "7" on the other scale. The two tokens on the latter are then moved toward one another one unit of linear displacement to the next adjacent hole so that one token is now disposed in a hole associated with numeral "2" and the other with numeral "6." This procedure is followed until both tokens are placed at a common linear displacement from the origin 16 thereby identifying numeral "4." At that disposition the two tokens are nested together.

The sum of the augend and addend is not necessarily limited to a first order of numbers. For example, the following equation can be performed:

$$9+7=16=10+6$$

Thus, a token placed at "9" and another token placed at "7" on one scale are counterbalanced by placing one token on the other scale in the hole identified by numeral "10" and a second token disposed to be carried in the hole associated with numeral "6." Accordingly, the importance of the provision of a hole corresponding to the first number of the next greater order of numbers, i.e., a "10" hole is demonstrated.

Addends and augends can themselves each exceed the first order of numbers. For example to add $$19+17=36=3(10)+6$$

The addend of 19 is formed by placing one token in the "9" hole and one in the "teen" or "10" hole of the same scale. Seventeen (17) is then added to 19 by placing a third token in the "7" hole and a fourth token on top of the previous token in the "10" hole. In order to identify the sum of the two second order numbers represented on the scale three tokens representing ten, twenty, and thirty are nested together at the "10" hole on the other scale. After observing that the beam is not yet balanced, the student will then need to dispose a token in the sixth hole of the last-named scale. Accordingly, familiarity with the "tens" function in arithmetic is generated.

Subtraction can also be performed by means of the teaching aid. For example where subtraction is taught by saying "4" and what number will equal "6" a token is first placed in the "6" hole of one scale and in the other scale a token is placed in the "4" hole. At this point, the problem then is stated to the student as "4" and what number will equal "6?" The student then simply uses his adidtion combinations whereby he adds another token at the "2" hole on the proper side to achieve a balanced condition. He then is shown the arithmetical expression of the same problem, i.e., $6-2=4$.

While subtraction is taught in terms of "6 take away 4 equals 2" the same procedure is followed.

Multiplication can be demonstrated by means of the arithmetic teaching aid. For example to perform 3×2=6 three tokens are placed in nested relation on the "2" hole of one scale to counterbalance a single token disposed in the "6" hole on the other scale. The student can then observe that it requires three tokens at the "2" hole to balance or equal 6. Thus three 2's give "6" as a result.

Dividing can be demonstrated by means of the device. As is recognized, dividing is considered to be a short method for substraction. This system is utilized widely in digital computers, for example, and therefore use of a device of the kind being described serves as something of a first introduction to this philosophy. For example, to divide 6 by 2 a token is first placed in the "6" hole on ones cale. On the other scale three tokens are disposed at the "2" hole. The beam 10 balances. One token is removed from the three nested at "2" simultaneously with the statement that "6 take away 2 once is 4." The token originally disposed in the "6" hole of the other scale will now have to be moved to the "4" hole. The procedure is then repeated noting that "4 take away 2 is 2" or "6 take away 2 twice is 2." Finally, the remaining token is taken away with the observation that "2 take away 2 is 0."

Thus, it will have been demonstrated that to take 2 away from 6 a total of three times is necessary to reach 0. Remainders can also be experienced, for example where three 2's are taken from a 7 the remainder will be 1.

From the foregoing it will be evident that there is provided an arithmetic teaching aid having wide limits of application. It will also be evident that a child who utilizes the device is in a position to correct his own mistakes by merely feeling the beam. The beam has little or no tendency to balance when the tokens are misplaced. Thus incorrect performance is readily corrected by the child himself.

A child is further encouraged to think in terms of "balanced" equations of the kind taught in the earlier grades.

By utilizing a scale on each arm of the beam when the scale identifies a sequence of numbers forming a first order, for example the ones order of integers, and in addition includes at least the first number of the next greater order, for example a "tens" position, an environment for learning decimal relationships can be experienced, while permitting use of the device throughout a wide range of numbers.

Storage space within fulcrum member 20 is provided wherein the tokens may be kept when not in use. The storage space need not be particularly large inasmuch as the tokens can be fitted telescopically within each other. To close the storage space and retain the tokens within fulcrum member 20, a door 35 is hung on hinges 36. Hinges 36 are secured to the outside bottom surface of the fulcrum member. Hinges 36 can, for example, be of a resilient plastic material attached as by bonding.

Means for engaging and holding door 35 in registration with and covering the open end of fulcrum member 20 includes an elongate registration rib 38 extending into fulcrum member 20 from the plane of door 35 so as to position the lower edge of the door with respect to opening 37.

Door 35 is held closed by frictional engagement. A pair of resilient friction members 39, 40 are spaced vertically apart a distance sufficient to receive that portion of fulcrum member 20 which forms flat 23. To close door 35, rib 38 is first registered in place and then the door pressed closed.

What is claimed is:

1. An arithmetic teaching aid comprising an elongated balance beam of predetermined length, a fulcrum member supporting said beam substantially at the center of gravity thereof to provide a pair of balance arms extending in opposite directions from said fulcrum member, each arm being formed to include a series of uniformly spaced engagement portions serving to subdivide same into a linear scale, said scales having a common origin substantially at the center of gravity of the beam, the linear displacement of each said engagement portion from the origin serving to define a lever arm having a length representing a number in a sequence thereof, said numbers comprising a scale including a first order of numbers, and a numeral associated with each said engagement portion to identify its related displacement from the origin and its relative position in the sequence of numbers, a plurality of tokens of equal predetermined weight formed to engage the engagement portions of one arm and carried to apply a given torque to said beam in one direction, the displacement from said origin of each of the plurality of tokens on said one arm identifying a given number, and another token of said predetermined weight formed to engage one of said engagement portions in the other arm and carried to apply an opposing torque, the displacement of the last-named token from said origin, when equally counterbalancing said plurality of tokens, serving to identify a number equalling the sum of said given numbers.

2. An arithmetic teaching aid as defined in claim 1 wherein the linear displacement of each said engagement portion from the origin serves to define a lever arm of a length representing a number in a sequence thereof, said sequence forming a scale including a first order of numbers commencing with the origin the lowest number thereof, and including the first number of the next greater order of numbers.

3. An arithmetic teaching aid as defined in claim 2 wherein said engagement portions are formed as recesses in the upper surface of said beam.

4. An arithmetic teaching aid as defined in claim 1 wherein the tokens of said plurality are formed to permit mutual engagement of one to the other, a vertical axis through the center of gravity of each token of said plurality and a vertical axis through the center of gravity of said mutually engaged plurality all lying in a common plane normal to the longitudinal axis of said beam when said beam is horizontally disposed.

5. A teaching aid as defined in claim 3 wherein the tokens of said plurality each include a protruding portion formed to coact with said recess to be engaged thereby, said tokens each further including a recess to engage the protruding portion of another of said tokens to dispose same in nested relation.

6. A teaching aid as defined in claim 1 wherein said fulcrum member includes a hollow interior and an access opening thereto to form a receptacle accommodating several of said tokens.

7. A teaching aid as defined in claim 6 further including a door hingedly supported from the base of the fulcrum member, said door being formed with a registration rib disposed in substantially parallel relation to the inner edge surface of said access opening, and a pair of resilient friction members spaced to frictionally receive and grip the upper edge of said access opening therebetween to latch said door closed.

References Cited by the Examiner

UNITED STATES PATENTS

| 1,977,842 | 10/34 | Badanes | 35—73 X |
| 2,325,488 | 7/43 | Donovan | 35—24 |
| 2,402,892 | 6/46 | Hubble | 35—31 |

FOREIGN PATENTS

| 650,205 | 2/51 | Great Britain. |
| 923,185 | 4/63 | Great Britain. |

JEROME SCHNALL, *Primary Examiner.*